March 23, 1954  W. W. MAHER  2,672,931
SHEET CUTTING MACHINE
Filed March 15, 1949  4 Sheets-Sheet 1
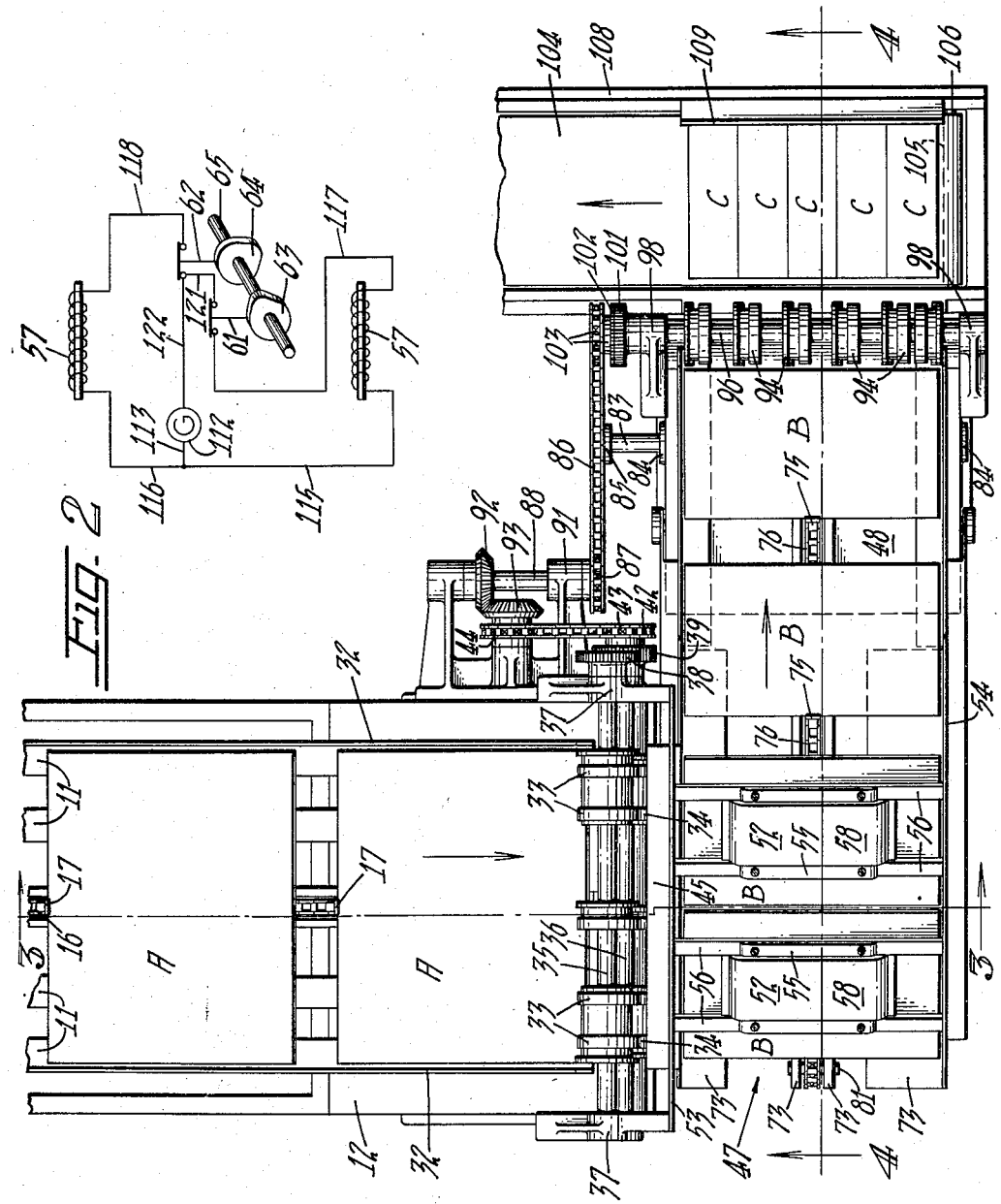
INVENTOR.
William W. Maher
BY Charles H. Erne
Ivan D. Thornburgh
ATTORNEYS

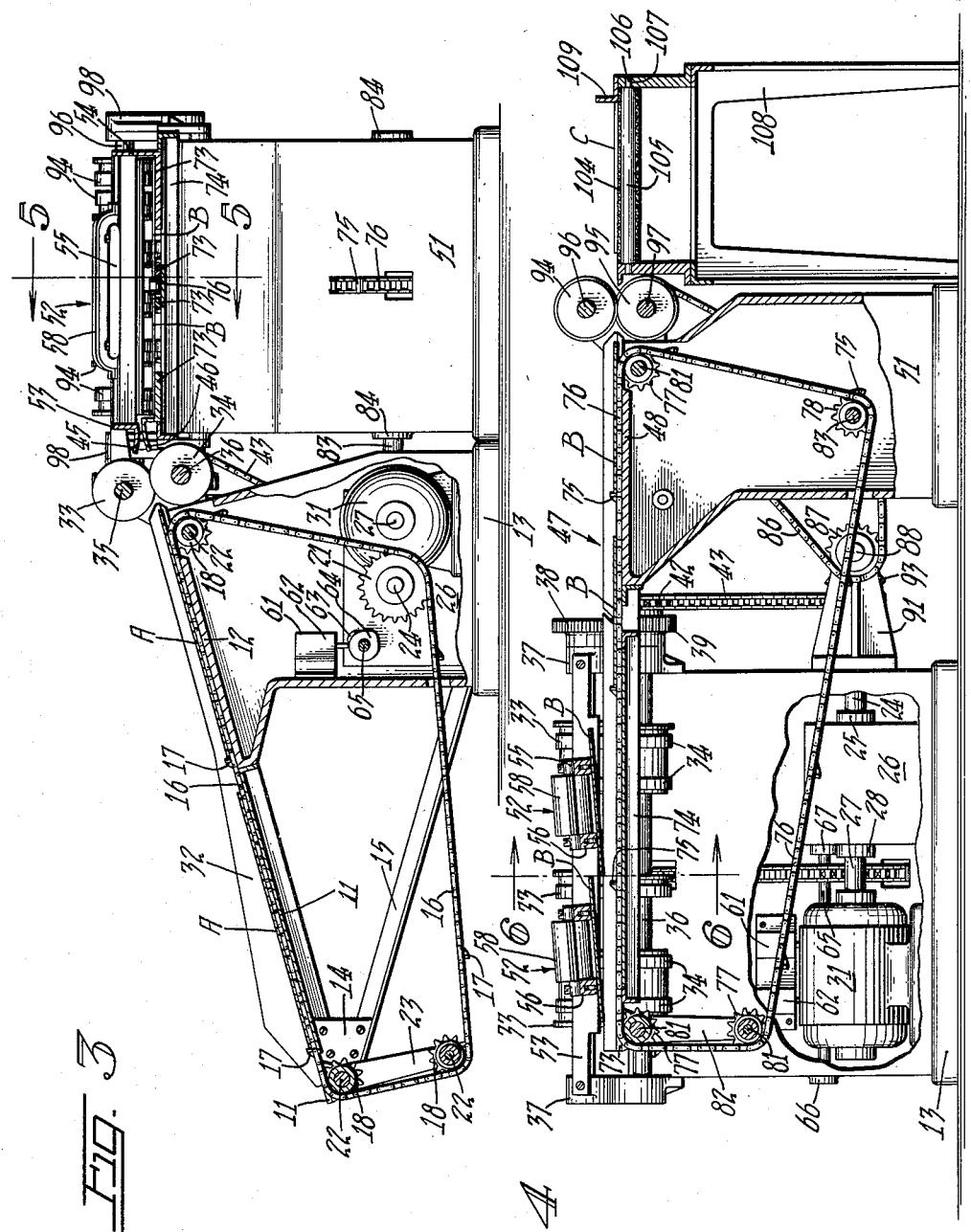

March 23, 1954 W. W. MAHER 2,672,931
SHEET CUTTING MACHINE
Filed March 15, 1949 4 Sheets-Sheet 3
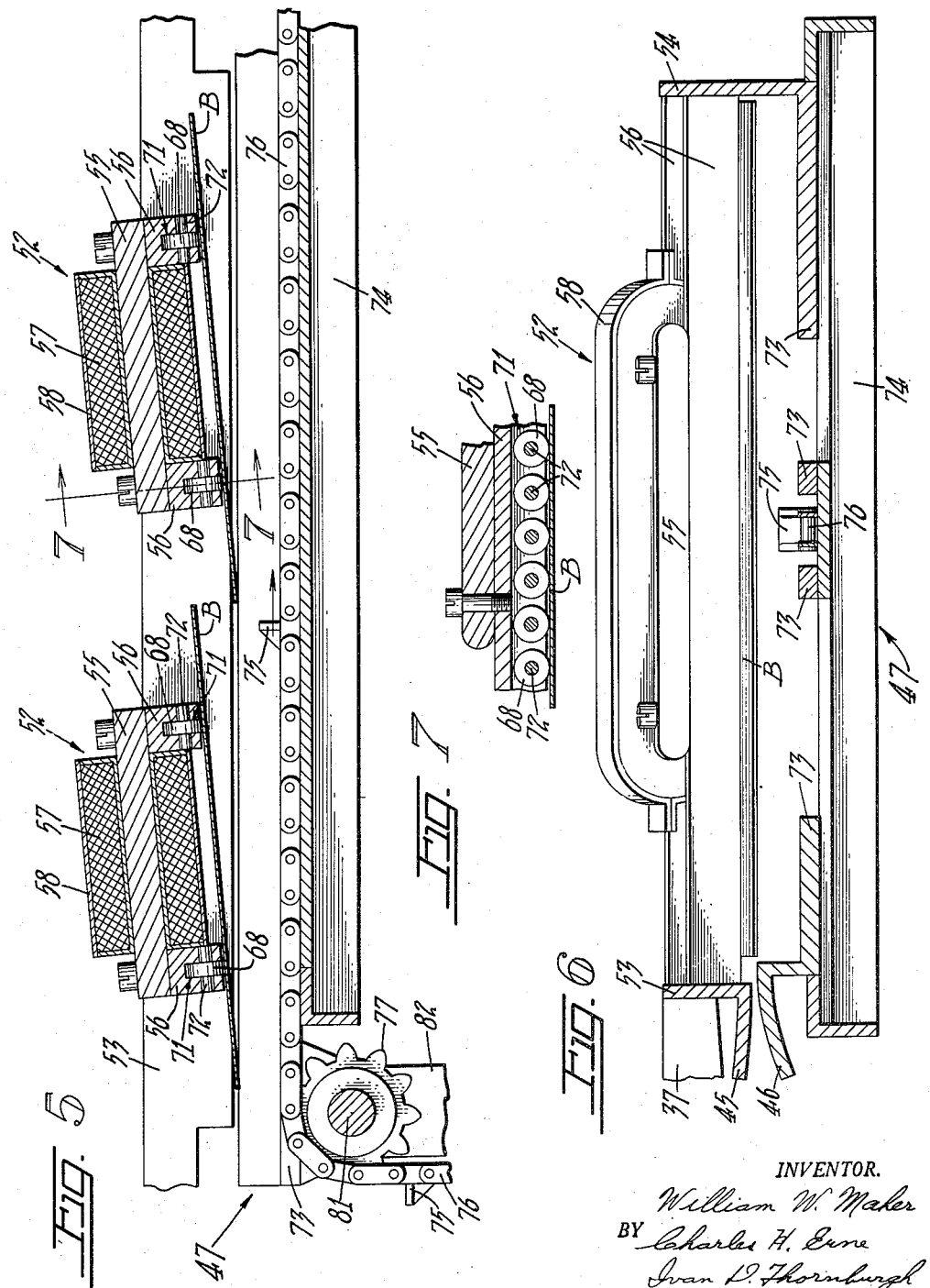
INVENTOR.
William W. Maher
BY Charles H. Erne
Ivan D. Thornburgh
ATTORNEYS

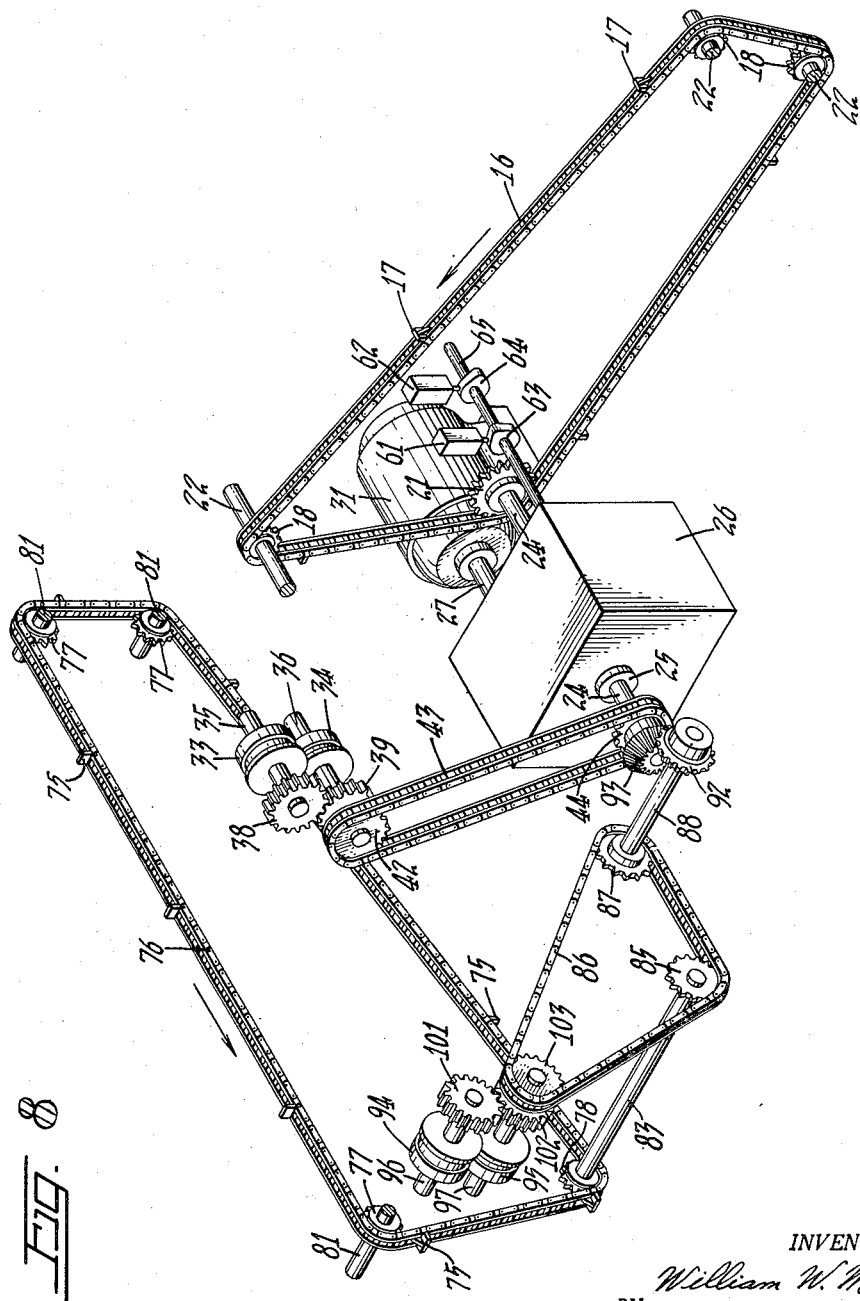

Patented Mar. 23, 1954

2,672,931

UNITED STATES PATENT OFFICE 2,672,931

SHEET CUTTING MACHINE

William W. Maher, San Francisco, Calif., assignor to American Can Company, New York, N. Y., a corporation of New Jersey Application March 15, 1949, Serial No. 81,466

8 Claims. (Cl. 164—61)

This invention relates to sheet cutting or slitting machines and has particular reference to devices for attracting, receiving and holding cut strips or blanks in a predetermined position and for releasing them in timed or spaced order for further advancement.

In the manufacture of cans or containers, metallic sheets such as tin plate, are cut into blanks or strips for forming into can bodies or other can parts. These blanks are cut by a machine having rotary cutters which rotate rapidly and which therefore discharge the cut blanks at a high rate of speed. In some machines the cut blanks are discharged onto a transfer conveyor for further feeding to an auxiliary cutter. In such machines the rapidly traveling blanks as they leave the cutters, are deposited on the transfer conveyor simultaneously and with considerable force. This causes the blanks to overlap, or skid across the conveyor or causes some of the blanks to fall on top of the feed dogs on the conveyor with the result that often some of the blanks become badly scratched or dented or sometimes severely damaged.

The instant invention contemplates overcoming these difficulties by providing a device which attracts and receives the cut blanks from the cutters and temporarily retards them and gently deposits them on a transfer conveyor in a desired sequential order, in time with the travel of the conveyor feed dogs.

An object of the invention is the provision in a sheet cutting machine of a device for receiving, locating and holding cut and moving strips or blanks and for releasing them in timed or spaced order so that they may be dropped into a desired predetermined position without danger of scratching or otherwise damaging the strips or blanks.

Another object is the provision in such a machine of electro-magnetic devices for attracting cut and moving metallic strips or blanks cut from a larger sheet and for holding them in a separated and predetermined position in readiness for individual release and in sequence with the timed operations of other parts of the machine.

Numerous other objects and advantages of the invention will be apparent as it is better understood from the following description, which, taken in connection with the accompanying drawings, discloses a preferred embodiment thereof.

Referring to the drawings:

Figure 1 is a top plan view of a sheet cutting or slitting machine embodying the present invention with parts broken away, the view also showing a plurality of sheets and blanks or strips passing through the machine;

Fig. 2 is a wiring diagram of the electric devices used in the machine;

Fig. 3 is a longitudinal section taken substantially along the line 3—3 in Fig. 1 with parts broken away;

Fig. 4 is a transverse section taken substantially along the line 4—4 in Fig. 1 with parts broken away;

Fig. 5 is an enlarged sectional view taken substantially along the vertical line 5—5 in Fig. 3 with parts broken away, the view showing electromagnetic holding devices used in the machine for attracting and holding the blanks or strips in suspended position;

Fig. 6 is a sectional view drawn to the same scale as Fig. 5 and illustrating one of the electromagnetic holding devices used in the machine, the view being taken substantially along a plane indicated by the line 6—6 in Fig. 4, with parts broken away;

Fig. 7 is a sectional detail of an electro-magnetic holding device as viewed substantially along the line 7—7 in Fig. 5; and Fig. 8 is a schematic perspective view showing how the various rotating parts of the machine are driven.

As a preferred or exemplary embodiment of the invention the drawings illustrate the principal parts of a tandem slitting machine of the type disclosed in United States Patent 2,355,079, issued August 8, 1944, to L. L. Jones on Sheet Slitting Machine. In such a machine metal sheets A having rectangular configuration (Fig. 1) are conveyed longitudinally of the machine and are trimmed and cut into two smaller size sheets or strips B. These sheets B are then conveyed transversely of the machine at right angles to their first path of travel, and are again trimmed and cut into can body blanks C. This completes the slitting operations and accordingly the blanks are conveyed to a suitable place of deposit.

The sheets A enter the machine from any suitable source of supply of such sheets and advance along an inclined runway which includes a plurality of support rails 11 (Figs. 1 and 3). These rails are secured to a table 12. The table is formed as an integral part of a machine base 13. The outer ends of the rails 11 extend beyond the table 12 and are braced by connecting brackets 14 and by a pair of angle irons 15 which extend from the brackets to the base 13.

The sheets A are propelled along the runway by an endless chain conveyor 16 (see also Fig. 8) having feed dogs 17 secured thereto at spaced intervals. The chain operates over a plurality of idler sprockets 18 and over a driving sprocket 21. The idler sprockets 18 are mounted on cross shafts 22 journaled in bearings formed in the machine base 13 and in a bracket 23 secured to the support rails 11.

The driving sprocket 21 is mounted on a drive shaft 24 which is journaled in a bearing 25 provided in the housing of a conventional gear reduction unit 26 (Figs. 3, 4 and 8). The shaft 24 is driven through the reduction unit 26 from a main drive shaft 27 which is journaled in a bearing 28 provided in this unit 26. The main drive shaft 27 is connected at its outer end to and driven by an electric motor 31. The reduction unit 26 and the electric motor 31 are located and suitably mounted within the frame or housing of the machine base 13.

As the conveyor 16 is driven by the drive sprocket 21, the dogs 17 on the chain engage behind the sheets A placed on the runway and propel them forwardly, in the direction of the arrow shown in Fig. 1, along the support rails 11. The sheets are guided along a straight line path of travel by a pair of spaced and parallel guide rails 32 which are formed on the outer support rails 11 (Figs. 1 and 3).

The conveyor 16 propels the sheets A toward a plurality of cooperating upper and lower trimming and slitting rotary cutters 33, 34 which are located adjacent the inner edge of the table 12 so that the sheets to be cut will pass between them. These cutters are mounted on a pair of spaced, parallel and horizontal shafts 35, 36 (see also Fig. 8) which are journaled in bearings 37 formed in the machine base 13. The shafts 35, 36 extend beyond the bearings on one side of the machine base and carry meshing gears 38, 39 which rotate the cutters 33, 34 simultaneously and in unison.

The lower cutter shaft 36 is rotated by a sprocket 42 which is mounted on this shaft adjacent the gear 39. The sprocket 42 is driven by an endless driving chain 43 which operates over it and over a drive sprocket 44 mounted on the drive shaft 24 (Figs. 1, 4 and 8).

When a moving sheet A propelled by the conveyor 16 passes between the rotating upper and lower trimming and slitting cutters 33, 34, its side edges are trimmed and the substantially rectangular sheet A is slit in the middle to produce two narrower sheets or strips B.

The cut or severed sheets B as they come from the cutters 33, 34 are directed between suitable guides 45, 46 into a path over an auxiliary or transverse conveyor unit 47 as an incident to being transferred thereto (Figs. 1, 3 and 4). The edge trimmings or scrap pieces are diverted and discharged from the machine in any suitable manner to a convenient place of deposit. The auxiliary conveyor unit 47 is secured to the machine base 13 and to a table 48 of an auxiliary machine base 51.

The sheets B as they are fed outwardly from the cutters 33, 34 advance into and are attracted by electro-magnetic holding or attracting devices 52. These holding devices maintain the sheets or strips B suspended at a predetermined location over the conveyor unit 47.

An electro-magnetic holding device 52 is provided for each of the sheets B. These holding devices are located in spaced relation above the auxiliary conveyor unit 47 and are secured at one end to a vertical wall 53 of the guide 45. The guide is mounted on lug extensions of the bearings 37 (see Figs. 1 and 3). The other end of the holding devices 52 are secured to a conveyor guide rail 54 (Fig. 6) mounted on the machine base 51. The electro-magnetic holding devices preferably are tilted at a slight angle relative to the horizontal as best illustrated in Figs. 4 and 5, so that the sheets or strips B upon being cut from a single sheet A will be shifted to separate their adjacent edges while the sheets or strips are fed into and held in their suspended positions.

Each electro-magnetic holding device 52 includes a flat core member 55 (Figs. 5, 6 and 7) which is secured along its opposite side edges to a pair of spaced elongated bars 56. An electric coil 57 surrounds the core and when the coil is energized it sets up a magnetic field around the bars and this field attracts and holds a sheet or strip B as hereinbefore explained. The electric coil is protected by a casing 58.

The electro-magnetic devices are energized through a major part of the cycle of operations of the machine so that the sheets or strips B upon being moved into their suspended positions over the conveyor unit 47 may be held there momentarily preparatory to their release at the proper time for deposit into desired spaced positions on the conveyor unit. For this purpose each of the electro-magnetic devices are energized and de-energized in proper sequence with the feeding of a sheet A. Thus, cam actuated switches 61, 62 are provided for connecting a source of electric current with the electric coils 57 of these devices. This will be described fully hereinafter in connection with the wiring diagram (Fig. 2).

The electric switches 61, 62 are mounted on the housing wall of the machine base 13 and are actuated by continuously rotating cams 63, 64 which are mounted on a shaft 65 journaled in bearings 66, 67 in the base frame 13 and in the reduction unit 26 (Fig. 4). The shaft 65 is rotated in proper time through the reduction unit 26 and makes one revolution for each of the sheets A fed between the cutters 33, 34 so that as the leading edges of the slit sheets B pass beneath the temporarily magnetized bars 56 they will be immediately attracted and supported by them while moving into their suspended positions.

In order to permit the free movement of the sheets or strips B relative to the bars 56 while they are attracted toward them, a plurality of non-magnetic free-wheeling rollers 68 are provided in each of the bars (Figs. 4, 5 and 7). The rollers 68 are located in spaced relation within a slot 71 formed in each of the bars and are rotatably carried on short shafts 72 secured in these bars. The periphery or contacting surfaces of these rollers preferably are spaced outwardly from the face of the bars 56 so that the sheets during their travel over the rollers are prevented from engaging the bars.

The slit sheets or strips B upon reaching their suspended positions (Figs. 1, 4 and 5) are held in readiness for release onto the auxiliary conveyor unit 47. This conveyor unit includes a plurality of runway rails 73 which are mounted on a horizontal runway 74 and on the table 48. The runway 74 extends transversely of the machine and is supported at its forward end by the machine base 51.

The sheets or strips B are released onto the conveyor unit 47 in sequence with respect to a plurality of advancing feed dogs 75 which are spaced at intervals and secured to an endless chain conveyor 76 so that the sheets will be propelled forwardly along the runway rails 73 at right angles to their former path of travel. For this purpose the chain conveyor is operated in proper time with other moving parts of the machine (Fig. 8).

Hence, as the leading feed dog 75 approaches a position near the edge of one of the sheets or strips B (at the right as viewed in Figs. 1, 4 and 5) the electric coil 57 of the holding device 52 for this particular sheet B is de-energized momentarily through the opening of the switch 61 by the cam 63 and the sheet is thereby dropped into a desired position in front of the feed dog 75 on the conveyor rails for advancement along the conveyor. Similarly, as the next advancing feed dog 75 approaches the other suspended sheet B (at the left as viewed in the above mentioned figures) the electric coil 57 of the holding device supporting this particular sheet is de-energized momentarily through the opening of the switch 62 by the cam 64 and the sheet is dropped gently into its desired position on the conveyor for advancement therealong. During the normal operation of the machine these cycles of sheet release are repeated for each set of two sheets B fed. In this manner a sheet B is prevented from falling on top of a feed dog and is thus prevented from becoming jammed or scratched in the machine.

The chain conveyor 76 operates over a plurality of idler sprockets 77 and over a driving sprocket 78. The idler sprockets 77 are mounted on cross shafts 81 journaled in bearings formed in the machine base 51 and in a bracket 82 secured to the runway rails 73 (Fig. 4).

The driving sprocket 78 is mounted on a drive shaft 83 which is journaled in bearings 84 provided in the machine base 51 (Figs. 1, 4 and 8). The drive shaft 83 is driven by a sprocket 85 which is mounted on this shaft and which is rotated by an endless driving chain 86. The chain 86 operates over and is driven by a sprocket 87 mounted on a horizontal shaft 88 journaled in a bearing bracket 91 bolted to the machine base 13. The shaft 88 carries a bevel gear 92 which meshes with and is driven by a bevel gear 93 mounted on an extension of the main drive shaft 24 (Fig. 8). By means of this connection with the main drive shaft, the transverse chain conveyor 76 is actuated in timed relation with the longitudinal chain conveyor 16 hereinbefore described.

The conveyor 76 thus driven propels the sheet or strips B toward and between a plurality of cooperating upper and lower trimming and slitting cutter wheels 94, 95 located at the forward end of the auxiliary conveyor for cutting the strips or sheets B transversely into the blanks C hereinbefore mentioned. These cutter wheels 94, 95 and their manner of operation are similar to the cutters 33, 34 previously described.

The cutter wheels 94, 95 are mounted on a pair of spaced, parallel and horizontal shafts 96, 97 (Figs. 1, 3, 4 and 8) which are journaled in bearings 98 formed in the machine base 51. The shafts 96, 97 extend beyond the bearings on one side of the machine base and carry meshing gears 101, 102 so that the cutter wheels will rotate together simultaneously.

The lower cutter wheel shaft 97 is rotated by a sprocket 103 which is mounted on this shaft adjacent the gear 102. The sprocket 103 is driven by the endless driving chain 86 which operates over it and the sprockets 85, 87 hereinbefore mentioned (Figs. 1 and 8).

The square or rectangularly cut sheets or strips B after being cut into blanks C by the cutter wheels 94, 95 fall onto a continuously moving conveyor belt 104 which carries them to a suitable place of deposit (Figs. 1 and 4). The belt 104 operates over a pulley 105 mounted on a shaft 106 carried in bearings 107 formed in a stand 108 located adjacent the discharge end of the machine. A stop plate 109 secured to the stand adjacent the far side of the belt locates the blanks C on the belt as they pass from the cutter wheels 94, 95.

Reference should now be had to the wiring diagram in Fig. 2 which schematically shows the electric coils 57 of the electro-magnetic holding devices 52 connected to and receiving electric current from a suitable source such as a generator 112. These electric coils 57 are connected in series with their respective normally closed switches 61, 62 so that either of the coils may be energized or deenergized independently of the other during the cycle of operations of the machine.

The generator 112 is connected to two separate circuits by a lead wire 113. The lead wire 113 is connected by wires 115, 116 leading to the separate circuits and to one side of each of the coils 57. The opposite sides of these coils are connected by wires 117, 118 to one side of each of their respective switches 61, 62. The opposite sides of these switches are connected together by a wire 121. A wire 122 connected to the wire 121 at one side of the switch 62 also is connected to the generator as the return wire thus completing the circuits.

During the operation of the machine, electric current from the generator flows along the lead wire 113, the wires 115, 116 to the electric coils 57, through these coils and thence along the wires 117, 118 to the switches 61, 62, through these switches and returning along the wires 121, 122 to the generator 112. This energizes the electric coils 57 of the electro-magnetic holding devices 52 for effecting the successively timed engaging and holding of the slit sheets or strips B as previously described.

De-energizing of the coils 57 for the successively timed release of the sheets or strips B is effected momentarily by opening the normally closed switches 61, 62 connected to these coils in proper sequence. Hence, as the switches 61, 62 are actuated successively by the continuously rotating cams 63, 64 the separate circuits are independently broken and the respective electric coils 57 in the separate circuits de-energized. The sheets or strips B thus are released from the holding devices 52 in predetermined timed relation to drop between successive feed dogs 75 on the conveyor chain 76, thereby avoiding hitting the feed dogs and injuring the surface of the sheets or strips.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for cutting sheets into strips or blanks, the combination of means for feeding sheets to a sheet cutting station, cutting means at said station for cutting sheets into strips, a conveyor operable adjacent said sheet cutting station for transferring cut strips from the station, an attracting device disposed adjacent said station above the path of each moving strip and extending over said conveyor, each of said attracting devices being laterally inclined upwardly relative to the direction of movement of the conveyor beneath it for attracting and suspending a strip in laterally inclined discharge position above said conveyor, and control means connected with said attracting device and operable in time with the feeding of said sheets for releasing said strips in timed order for discharge onto said conveyor.

2. In a handling device for progressively moving magnetizable strips, the combination of a conveyor for feeding a row of strips, a plurality of spaced electro-magnetic holding devices located adjacent said conveyor, each of said electro-magnetic holding devices being disposed above and at an angle relative to each strip for tilting adjacent strips upon engagement therewith to separate their adjacent edges and to hold said strips with their edges separated when moving the strips into predetermined positions, and control means connected with said strip holding devices and operable in time with the feeding of said strips for releasing them successively and in timed order from said electro-magnetic holding devices thereby spacing the strips for further disposition thereof.

3. In a machine for cutting magnetizable sheets into strips and blanks, the combination of means for feeding individual sheets to a sheet cutting station, cutting means at said station for cutting sheets into strips, an electro-magnetic holding device located adjacent said cutting station for receiving a cut strip as it is discharged by said cutting means and for holding the strip in suspended position, a conveyor having a feed dog moving under said holding device, and a control switch connected with said strip holding device and operable in time with the movement of said feed dog for effecting the energizing and de-energizing of said electro-magnetic holding device for the holding and for the release of the cut strip so that the strip falls immediately in front of and is advanced by said feed dog.

4. In a machine for cutting magnetizable sheets into strips and blanks, the combination of means for feeding individual sheets to a sheet cutting station, cutters mounted at said station for cutting said sheets longitudinally into strips, an electro-magnetic holding device located adjacent said cutting station for receiving the cut strips as they are discharged from said cutters, said device holding each strip in suspended position, a conveyor having a plurality of spaced feed dogs moving under said holding device, and control means connected with said strip holding device and operable in time with the movement of said feed dogs for releasing each cut strip from said holding device so that it falls immediately in front of and is advanced by a said feed dog.

5. In a machine for cutting magnetic sheets into strips or blanks, the combination of a conveyor for feeding individual sheets to a sheet cutting station, cutting means at said station for cutting sheets into strips, a plurality of spaced electro-magnetic holding devices located adjacent said cutting station for receiving, locating and holding said cut strips in predetermined positions, and control means connected with said strip holding devices and operable in time with the feeding of said sheets for releasing the cut strips successively and in timed order from said holding devices thereby spacing them for further advancement.

6. In a machine for cutting magnetic sheets into strips or blanks, the combination of a conveyor for feeding individual sheets to a sheet cutting station, cutting means at said station for cutting sheets into strips, a plurality of spaced electro-magnetic holding devices located adjacent said cutting station, each of said electro-magnetic holding devices disposed at an angle relative to the plane of a sheet being cut for tilting adjacent cut strips upon engagement therewith to separate their adjoining cut edges and to hold said strips with their edges separated when moving the strips into predetermined positions, and control means connected with said strip holding devices and operable in time with the feeding of said sheets for releasing the cut strips successively and in timed order from said holding devices thereby spacing them for further advancement.

7. In a machine for cutting magnetic sheets into strips or blanks, the combination of a conveyor for feeding individual sheets to a sheet cutting station, cutting means at said station for cutting sheets into strips, an auxiliary conveyor operable adjacent said sheet cutting station and in time with said conveyor for transferring cut strips from said station, a plurality of electro-magnetic holding devices comprising one holding device for each strip in a sheet, said holding devices being located adjacent said cutting station and over said auxiliary conveyor for locating and holding the strips as they are cut from a sheet in predetermined suspended positions above said auxiliary conveyor, and control means connected with said strip holding devices and operable in time with the travel of said auxiliary conveyor for releasing the cut strips in sequence from said holding devices for discharge into predetermined spaced positions on said auxiliary conveyor.

8. A handling device for progressively movable magnetizable sheets, strips and blanks comprising a pair of spaced ferrous metallic bars, a plurality of non-magnetic rollers carried in said bars, an electro-magnet secured to said bars for creating a magnetic field around said bars and said rollers when said electro-magnet is energized, said bars attracting a magnetic strip movable into a position on said rollers and adjacent said bars for locating and holding the strip at rest, and control means connected with said handling device and operable for de-energizing said electro-magnet for releasing the strip from said handling device.

WILLIAM W. MAHER.

References Cited in the file of this patent

UNITED STATES PATENTS

| Number | Name | Date |
|---|---|---|
| 725,453 | Knowlton | Apr. 14, 1903 |
| 962,191 | Bierman et al. | June 21, 1910 |
| 1,343,648 | Smith | June 15, 1920 |
| 2,236,193 | Hazelton | Mar. 25, 1941 |
| 2,334,645 | Plumb | Nov. 16, 1943 |